United States Patent [19]
Magdassi

[11] Patent Number: 4,946,269
[45] Date of Patent: Aug. 7, 1990

[54] COLORED CONTACT LENS

[75] Inventor: Shlomo Magdassi, Jerusalem, Israel

[73] Assignee: Med Optics Corporation, Maaleh Edomim, Israel

[21] Appl. No.: 205,698

[22] Filed: Jun. 13, 1988

[30] Foreign Application Priority Data

Jun. 23, 1987 [IL] Israel ................................. 82961

[51] Int. Cl.$^5$ ................................. G02C 7/04
[52] U.S. Cl. ................................. 351/162; 351/177
[58] Field of Search ............... 351/160 R, 160 H, 161, 351/162, 177

[56] References Cited

U.S. PATENT DOCUMENTS 4,729,914 3/1988 Kliment et al. ............. 351/160 R X

FOREIGN PATENT DOCUMENTS 01598999 10/1985 European Pat. Off. .
0187137 7/1986 European Pat. Off. .
8504679 10/1985 PCT Int'l Appl. .

Primary Examiner—Scott J. Sugarman
Attorney, Agent, or Firm—Pollock, VandeSande and Priddy

[57] ABSTRACT

The invention provides an opaque contact lens comprising a lens body constructed of polymer and solid latex polymer particles directly bound to at least a portion of a surface of the lens and a method for the production thereof.

2 Claims, 1 Drawing Sheet

COLORED CONTACT LENS

BACKGROUND OF THE INVENTION

The present invention relates to a colored contact lens and to methods for the production thereof. More particularly, the present invention relates to an improved method for preparing soft contact lenses capable of imparting an apparent color modification to the wearer's iris. The inventive lenses may be prepared with or without an optical prescription for correcting visual defects. The inventive lenses contain an opaque color coat which can bring about a fundamental color change in the apparent color of the wearer's iris, for example from dark brown to light blue.

DESCRIPTION OF THE PRIOR ART

Tinting of contact lenses has been known for some years. A kit is available, which permits manufacturers as well as practitioners to tint contact lenses of the HEMA-type material by masking the pupil area and any other, e.g., peripheral, area that should remain clear, and applying a few drops of tint of the desired hue to the unmasked lens surface, letting it react with the latter for a specified period of time, and then rinsing off the excess tint. Some tints require a fixing solution. While this method is relatively simple, results are invariably poor: the solidly colored areas of the irises impart to the eyes the glassy, artificial look of doll's eyes. Real irises are, of course, never of a solid color, being streaky and even blotchy.

Attempts were also made to hand-paint irises onto lenses. Depending on the skill of the artist, immediate, visual results were apt to be quite good. However, not only were these hand-painted contact lenses too expensive for wider use, but the paint layer also interfered with oxygen permeability of the lens and rubbed off after comparatively short use.

Another commercially available tinted contact lens provides an iris pattern of acceptable naturalness which is printed onto the contact lens. The firm producing this lens has, however, not yet succeeded in achieving full control over hues and, therefore, reproducibility of the process they are using is rather poor. If one lens of a pair of lenses should get lost, it is rather difficult to obtain a matching lens.

SUMMARY OF THE INVENTION

It is one of the objects of the present invention to overcome the drawbacks and difficulties of prior-art methods for tinting of contact lenses, and to provide a method that, at relatively little expense, facilitates the tinting of such lenses, producing highly natural looking irises of fully controllable and reproducible color and hue, which lenses are also opaque.

In European Patent Application No. 86100053.7 published 01.07.86 under publication No. 0187137 there is described and claimed.

A method for making a colored contact lens comprising the steps of:

(a) providing a contact lens constructed of polymer, (b) coating at least a portion of a surface of the lens with a color coat comprising coloring substance and binding polymer, and (c) binding the lens polymer to the binding polymer by the reaction of functional groups selected from at least one of —COOH, —OH, and —NH—R, wherein R is hydrogen or alkyl with functional groups selected from at least one of —NCO and epoxy, wherein either (A) the lens polymer and binding polymer have functional groups selected from at least one of —COOH, —OH, and —NH—R, and the color coat also comprises an additional compound having at least two groups per molecule selected from at least one of —NCO and epoxy; or (B) the lens polymer has functional groups selected from at least one of —COOH, —OH, and —NH—R, and the binding polymer has functional groups selected from at least one of —NCO and epoxy; or (C) the lens polymer has functional groups selected from at least one of —NCO and epoxy, and the binding polymer has functional groups selected from at least one of —COOH, —OH, and —NH—R; or (D) the lens polymer and binding polymer have functional groups selected from at least one of —NCO and epoxy and the color coat also comprises an additional compound having at least two groups per molecule selected from at least one of —COOH, —OH, and —NH—R.

An examination of said publication, however, shows that the method involves the use of an isocyanate linking compound such as hexamethylene diisocyanate (HMD) and as indicated on page 23 of said specification, the printed lenses are heated at 80°C. for 72 hours at atmospheric pressure to produce lenses which pass the rub test.

In contradistinction to the teachings of said publication, there is now provided opaque colored contact lenses which are prepared without the need for an isocyanate linking compound and in which a lens to which has been applied opaquing and coloring material according to the present invention can be cured in less than two hours to form a colored lens which passes both the rub test and the methanol test which are known standard tests to determine the strength of the adhesive bond. In the rub test the prepared lenses are folded back upon themselves, printed side in, and rubbed between the thumb and forefinger. In the methanol test the lenses are sprayed with methanol at room temperature for 30 seconds. In both tests adhesion or lack thereof is observed visually. The methanol test is more severe than the rub test.

The present invention is based on the discovery that latex particles can be made to directly adhere to the surface of a lens to render the lens opaque and that unlike HMD, which is only good for dry lenses, latex particles can be applied to a wet lens.

Thus according to the present invention there is now provided an opaque contact lens comprising a lens body constructed of polymer and solid latex polymer particles directly bound to at least a portion of a surface of the lens.

The invention also provides a method for making an opaque contact lens comprising: reacting a contact lens constructed of a polymer with a latex emulsion at a temperature of about 35° C.–150° C. for about 30–90 minutes, whereby latex particles directly adhere to at least a portion of a surface of the lens and impart opacity thereto.

In Sterman U.S. Pat. No. 4,811,622 issued Mar. 14, 1989 there is described and claimed a method for tinting contact lenses, comprising the steps of:

providing contact lenses;

providing at least one transfer-pad printer, including a suitable ink of the desired tint;

providing at least one printing block carrying an iris pattern:

attaching said contact lenses to lens mounts:

aligning said mounted lens with the pad of said transfer-pad printer;

inking said printing block:

causing said pad to pick up said iris pattern from said inked block, and causing said pad to make contact with said mounted lens, thereby transferring said iris pattern as picked up from said block to said mounted contact lens.

Said method, however, did not produce, and said specification did not teach how to produce, opaque lenses necessary for effecting apparent change in iris color.

Said method can be modified and used for carrying out the present invention and will be used to illustrate the carrying out of the present invention.

As stated hereinbefore the method of the present invention is based on adhesion of latex particles directly onto the lens.

Latex particles are polymeric particles, usually in the size range 5–0.1 mm. They are usually prepared by emulsion polymerization. A typical latex is made of polystyrene particles.

A modified latex is the latex which contains also some reactive (or functional) groups, such as amide groups and carboxilic groups.

The latex can be either from commercial sources (without knowing the exact composition) for the textile industry, for example, or from simple emulsion polymerization reactions.

The latex could be either from commercial source, or prepared by a simple process from monomers such as methylmethacrylate, methacrylic and acrylic acid, glycidyl acrylate, glycydyl methacrylate, etc. The process is based on emulsion polymerization, which is known to those skilled in making latex.

The latex particles, which are solid polymer particles, adhere to the lens and render it opaque.

The adhesion is achieved or the latex particles to the lens without the need for a bridging linking or binding agent or even the need for a solvent, since the adhesion can take place in an aqueous medium. The term "directly bound" is used herein and in the appended claims to define this aspect of the present invention, i.e., adhesion without the use of an intermediate bridging, linking or binding agent.

The process of binding latex to a lens is dependent on the chemical nature of both: for example, the latex AA-10 is suitable for CSI contact lenses (made of glyceryl methacrylate), HA-24 is suitable for $CSI^R$ and Softmate $B^R$ (based on HEMA) contact lenses sold by Pilkington Contact Lens U.K.

Latex emulsions obtained from Rohm and Haas and sold commercially under the designation HA24 and W0004 were both found to work in the present invention alone or in a 1:1 mixture. Both are commonly available and used in the textile industry, the first being described as containing acrylonitrile and acrylates and the other being known as an acrylic emulsion.

In order to achieve the proper opacity, it is possible to use mixtures of various latexes, differing in chemical nature and particle size distribution.

Both emulsions yielded an opaque lens after curing in an oven at 100° C. for one hour.

Another suitable latex emulsion is AA-10, from Beit Goubrin Polymers, Israel.

The invention will now be described in connection with certain preferred embodiments with reference to the following illustrative figures so that it may be more fully understood.

With specific reference now to the figures in detail, it is stressed that the particulars shown are by way of example and for purposes of illustrative discussion of the preferred embodiments of the present invention only and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the making apParent to those skilled in the art how the several forms of the invention may be embodied in practice.

DESCRIPTION OF THE PREFERRED EMBODIMENTS

Figure 1:
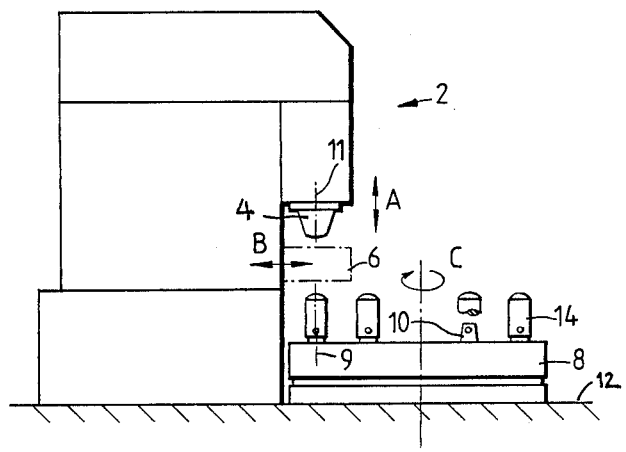
FIG. 1 is a schematic illustration of the tinting setup.
Figure 2:
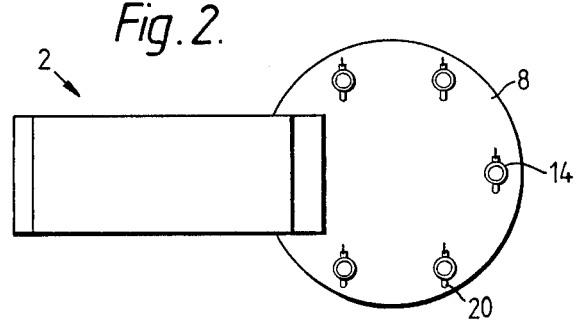
FIG. 2 is a top view of the setup of FIG. 1.

Referring now to the drawings, there is seen in FIGS. 1 and 2 a transfer-pad printer 2 provided with a pad 4 movable vertically in direction of double arrow A. and a printing-block holder 6 on which is mounted the block carrying the iris pattern (to be described further below) and which can move horizontally in direction of double arrow B. There is further seen an index table 8 rotatable in direction of arrow C. At uniform angular spacing, index table 8 is provided with tapering projections 10 defining what will be referred to as "stations", all of which projections are located on a circle the center of which lies on the axis of rotation of the index table 8. Both the transfer-pad printer 2 and the index table 8 are mounted on a common base 12, their mutual relationship being such that whenever the table 8 indexes, the center line 9 of one of the projections 10 is in accurate alignment with the center line 11 of the pad 4. In a manner to be explained further below, the indexing movement of the table 8 is coordinated with the up-and down movement of the pad 4 and the in-and-out movement of the block holder 6.

Mounted on the projections 10 are lens mounts 14 (see FIG. 3). advantageously made of stainless steel, which, at their lower end, have a female taper 16 matching the tapering projections 10 integral with the indexing table 8. Their upper ends 18 are convexly spherical and have a radius of curvature R which is slightly smaller than the radius of curvature of the concave base curve of the (properly wetted) lens i.e., that surface of the contact lens that floats on the cornea. The reason for this difference in radii will be explained further below.

The matching tapers of the projection 10 and the female taper 16 ensure that the center of curvature of the upper end 18 of all lens mounts 14 is always located on their center line 9 which, in its turn, whenever a lens mount 14 is moved below the pad 4, is always aligned with the center line 11 of the pad 4. A pin 20, pushed into a hole drilled through both the projection 10 and the mount 14 locks the mount in position during the actual tinting operation.

Figure 3:
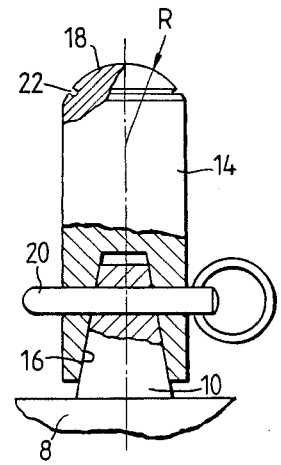
FIG. 3 shows a partly cross-sectional view of the lens mount.

There is further seen in FIG. 3 a groove 22, machined into the spherical end 18, which, as will become clear presently, facilitates centering of the lens on the lens mount 14.

In the following, a detailed description will be given of the tinting method according to the invention.

Figure 4:
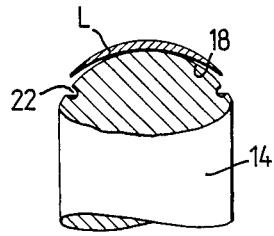
FIG. 4 shows a contact lens as freshly placed on a lens mount.
Figure 5:
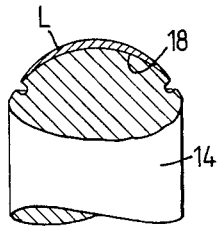
FIG. 5 shows the lens as shrunk onto the lens mount.

A lens L to be tinted is removed from the bottle in which it has been soaked for e.g., 24 hours in saline or any other suitable soaking solution, and is placed onto the spherical end 18 of one of the lens mounts 14 which, at this stage, are not yet mounted on the index table 8. In FIG. 4, the difference in radii, being intentionally exaggerated, is clearly seen. Also seen is the centering groove 22 which, being of the same diameter as the fully soaked lens, serves as a reference circle for manually centering the lens L, to make sure that the center line 9 of the lens mount 14 passes through the center of the circular edge of the lens L.

Centering having been accomplished, the lens L is left on the mount 14 for a specified period of time, to allow a certain percentage of water to evaporate from the lens. It is during this evaporation process that the lens shrinks onto, and clings to, the mount 14 obviating the need for adhesive pitch or wax. The evaporation time Period is of importance, as too wet a lens will not properly stick to the mount, and might develop air pockets and wrinkles which will obviously interfere with the printing or transfer process which requires a hard and smooth supporting surface. Too dry a lens on the other hand will not only cause the iris diameter to be of incorrect size, but the tint will not take, as the lens pores into which the ink must be absorbed are large enough only when the lens material has swelled to a certain size.

When determining the optimum evaporation period, the following factors must be taken into account:
(1) the raw material of the lens;
(2) ambient air conditions:
(3) diameter of the printed iris, and
(4) the additional time required for mounting the lens mount 14 on the index table and performing the actual printing step.

The latter is carried out with the aid of the transfer-pad printer 2 which operates as follows:

An ink block is prepared containing 40 percent ink by weight and 60 percent latex by weight (in this case Rohm and Haas HA24) using a glycol based ink commercially sold for tinting contact lenses and which was soluble with the latex being used.

In a first stroke, the pad 4 picks up the pattern from the inked block mounted in the block holder 6 which, at this stage, projects from the printer as indicated by the dash-dotted lines in FIG. 1. Having picked up the pattern, the pad 4 moves up again, the block holder 6 is withdrawn, clearing the path for the pad 4 to move down again and, in this second working stroke, to place the pattern onto the lens that has previously been moved by the index table 8 from the "waiting" to the "printing" position. The table 8 which has several stations is coordinated in its indexing steps with the movements of the printer 2 and may move only in the time period between the upstroke of the pad 4 after printing and the withdrawal of the block holder 6 in preparation for the next printing stroke.

Having been imprinted, the lens, together with its mount 14 to which it still adheres, is transferred to an oven. Another alternative is to remove the lens from the lens mount (as the lens is still wet it can be peeled off the mount without danger of cracking) and place the lens in the oven.

Having been placed in an oven the lens enters a curing stage. The temperature range is from 35° C. to 150° C. with a preferred temperature range of 80° C. to 95° C. The time required will vary depending on the latex composition with a range of 5 to 90 minutes with a preferred range of 30 to 45 minutes at 90° C.

Lenses passing both the rub test and the methanol test were prepared using a transfer pad containing 30 to 40 percent (glycol based) ink by weight and 60 to 70 percent latex by weight, and the prepared lenses being cured for 25 minutes at 120° C., for 30 minutes at 90° C. and for 10 minutes at 90° C. plus 55 minutes at 65° C.

Using latex has the advantage that higher water content lenses can be used such as nvp/pvp lenses with a 70% water content since the lenses can be cured at lower temperatures.

Having been cured in an oven for a specified time at a specified temperature depending on the latex composition and the lens material, the lens is transferred to an ultrasonic bath and again absorbs liquid.

If the lens was placed in the oven together with the lens mount, it will detach by itself.

As will be realized the method of the present invention has many advantages over those methods taught in the prior art including:

a. There is no need for "turbidity agent", such as $TiO_2$;

b. there is no need for a "binding polymer" (or bridging polymer) since it already exists in the particles;

c. it is possible to print directly on a wet lens:

d. there is no need for solvents; water is enough:

e. the reaction conditions are simple;

f. it is possible to prepare the latex particles from the same material as the lenses;

g. the low temperature storage problem of HMD which self polymerizes unless stored below 20° C. is avoided; and h. the method can be used on high water content soft lenses since curing can even be effected at a temperature of about 65° C. to 90° C. with the latexes tested and at even lower temperature of about 35° C. with lower curing temperature latexes available on the market.

It will be evident to those skilled in the art that the invention is not limited to the details of the foregoing illustrative examples and that the present invention may be embodied in other specific forms without departing from the essential attributes thereof, and it is therefore desired that the present embodiments and examples be considered in all respects as illustrative and not restrictive, reference being made to the appended claims, rather than to the foregoing description, and all changes which come within the meaning and range of equivalency of the claims are therefore intended to be embraced therein.

What is claimed is:

1. Opaque contact lens comprising a lens body constructed of polymer and solid latex polymer particles directly bound to at least a portion of a surface of the lens.

2. An opaque contact lens as claimed in claim 1 wherein said latex particles are of the same material as the lens.

* * * * *